(12) United States Patent
Sekiya

(10) Patent No.: US 6,870,364 B2
(45) Date of Patent: Mar. 22, 2005

(54) CONNECTION STRUCTURE OF NON-CONTACT ROTARY SENSOR WITH ROTATING SHAFT

(75) Inventor: Mitsuru Sekiya, Odawara (JP)

(73) Assignee: Mikuni Corporation, Tokyo (JP)

(*) Notice: Subject to any disclaimer, the term of this patent is extended or adjusted under 35 U.S.C. 154(b) by 91 days.

(21) Appl. No.: 10/333,798

(22) PCT Filed: Jul. 18, 2001

(86) PCT No.: PCT/JP01/06198
§ 371 (c)(1),
(2), (4) Date: Jan. 24, 2003

(87) PCT Pub. No.: WO02/10690
PCT Pub. Date: Feb. 7, 2002

(65) Prior Publication Data
US 2003/0107368 A1 Jun. 12, 2003

(30) Foreign Application Priority Data
Jul. 27, 2000 (JP) ................................ 2000-226264

(51) Int. Cl.[7] ................................................ G01B 7/30
(52) U.S. Cl. ............................ 324/207.2; 324/207.25
(58) Field of Search .................. 324/207.2–207.22, 324/207.25, 262; 73/493, 866.5; 310/68 B; 384/448

(56) References Cited

U.S. PATENT DOCUMENTS

| | | | | |
|---|---|---|---|---|
| 4,321,495 A | * | 3/1982 | Kennedy | ............. 310/164 |
| 5,394,081 A | * | 2/1995 | Ogawa et al. | ............. 324/174 |
| 5,722,777 A | * | 3/1998 | Ouchi | ............. 384/446 |
| 6,188,216 B1 | * | 2/2001 | Fromer | ............. 324/207.2 |
| 6,210,103 B1 | * | 4/2001 | Ramsay | ............. 415/112 |
| 6,479,987 B1 | * | 11/2002 | Marx et al. | ............. 324/207.2 |
| 6,545,462 B2 | * | 4/2003 | Schott et al. | ............. 324/207.2 |
| 6,593,734 B1 | * | 7/2003 | Gandel et al. | ............. 324/207.25 |
| 6,693,421 B2 | * | 2/2004 | Wolf | ............. 324/207.2 |
| 2002/0153879 A1 | | 10/2002 | Muraji et al. | |

FOREIGN PATENT DOCUMENTS

| | | |
|---|---|---|
| JP | 8.285518 | 11/1996 |
| JP | 2001-074409 | 3/2001 |
| JP | 2001-124102 | 5/2001 |

* cited by examiner

*Primary Examiner*—Jay Patidar
(74) *Attorney, Agent, or Firm*—Wenderoth, Lind & Ponack, L.L.P.

(57) ABSTRACT

A structure for connecting a rotating shaft to a rotary sensor, includes a first stator having two magnet-facing sides disposed on an arc and spaced apart, a second stator having one magnet-facing side and disposed between the two magnet-facing sides, a hall element disposed between the first and second stators, a moving magnet having different polarities and disposed along the outside arc of the three magnet-facing sides, and a rotor having the moving magnet. The rotating shaft is loosely fitted in a fitting hole 116b of the rotor. The rotating shaft is supported in the fitting hole by a pin, and a clearance-maintaining member maintains the distances between the moving magnet and the first and second stators constant. The rotary sensor can detect angles accurately even if misalignment occurs between the center of the rotor and the center of the rotating shaft.

8 Claims, 8 Drawing Sheets

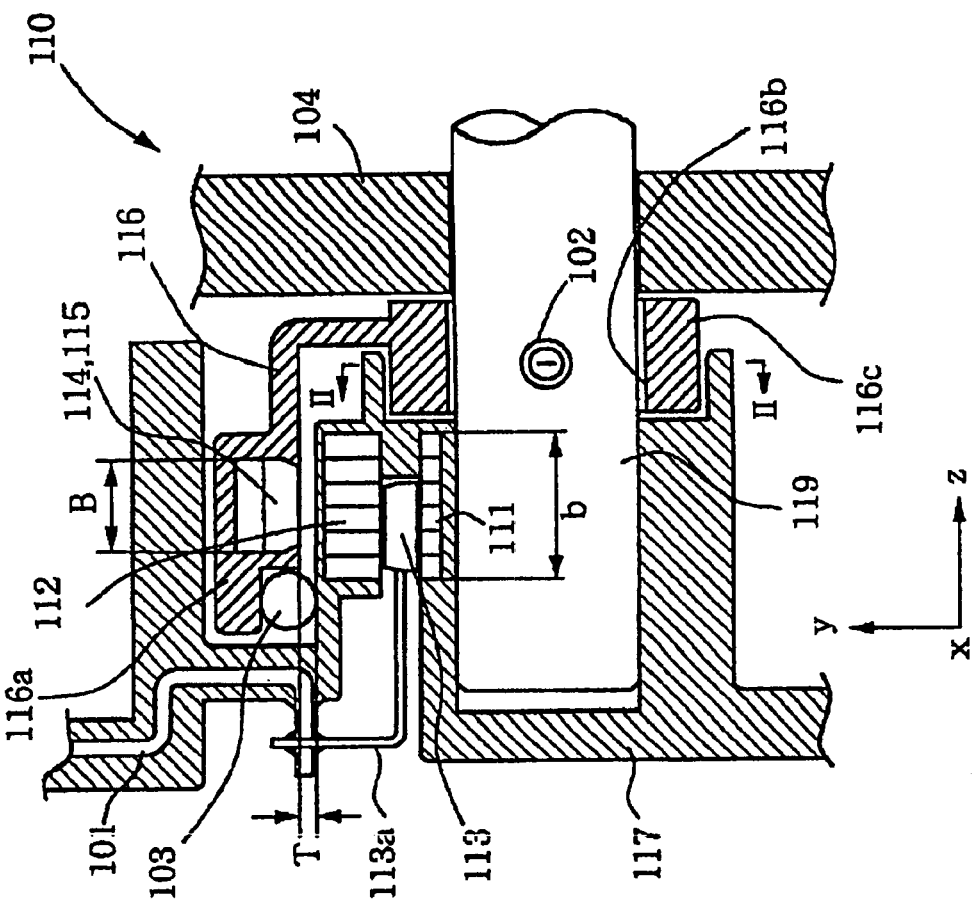
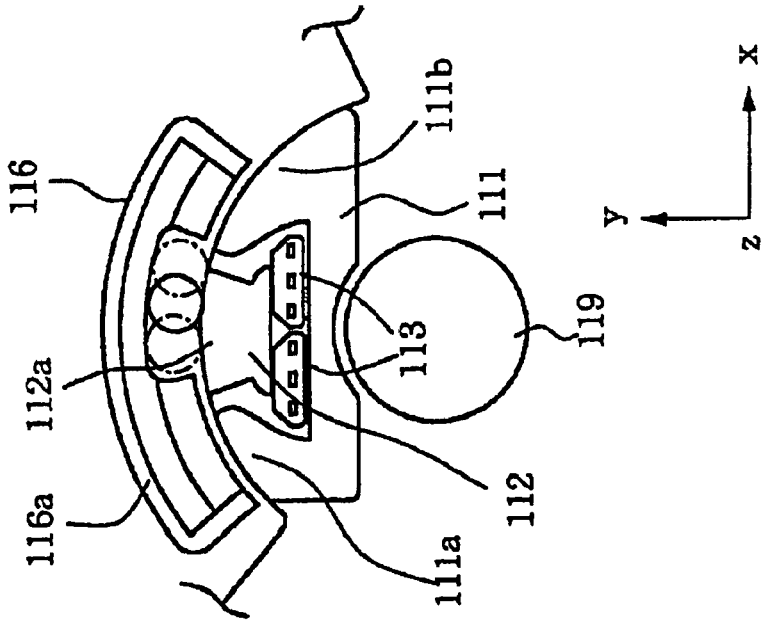

CONNECTION STRUCTURE OF NON-CONTACT ROTARY SENSOR WITH ROTATING SHAFT

TECHNICAL FIELD

The present invention relates to a coupling structure of a rotary sensor and a rotating shaft which is connected to the rotary sensor.

BACKGROUND ART

The applicant proposed a non-contact type rotary sensor which utilizes a hall element as shown in FIG. 6, in Japanese patent application No. H11-255409. This rotary sensor 10 comprises a first stator 11 having two magnet-facing sides 11a, 11b, a second stator 12 having one magnet-facing side 12a, a hall element 13 provided between the first and second stators, moving magnets 14, 15, and a rotor 16 to fix these moving magnets.

The three magnet facing sides 11a, 11b, 12a are arranged on nearly the same arc and, together, practically form a circle. On the other hand, the moving magnets 14, 15 are plate-shaped magnets that are curved into arc shapes at their magnet-facing sides, wherein the arc shapes have the same center of curvature. The magnets 14, 15 have poles in the plate thickness direction, and are arranged along the arc so that the poles of the moving magnets that are located next to each other are opposite to each other. The rotor 16 rotates along the arc.

In this example, when the moving magnets 14, 15 move along the arc, the magnetic flux passing through the hall element 13 changes. Therefore, by detecting the changes, the rotating angle of the rotor can be detected. Here, because the length of the two magnet-facing sides 11a, 11b of the first stator 11 can be set appropriately, the angle range of usage can be obtained as desired, and the resolution can be improved in this range.

FIG. 7 is a sectional view of the abovementioned rotary sensor in the assembled state, and FIG. 8 is a sectional view along line VIII—VIII in FIG. 7. As shown in FIG. 7, the first stator 11 and the second stator 12 are disposed in a case 17, and the hall element 13 is inserted between the stators.

The space inside the case 17 in which these are fitted is covered by a cover 18. A center pin 18a is mounted to the cover 18, and is fitted to a bearing hole 16a of the rotor 16 penetrating the first stator 11.

In ordinary cases, the rotor 16 receives offset force by the attracting force of the moving magnets 14, 15 to make the moving magnets 14, 15 get closer to the first and the second stators. However, the operation accuracy is maintained and the rotor 16 can rotate smoothly, because the center pin 18a is fitted to the bearing hole 16a of the rotor 16, and the slight clearance between the center pin and the bearing hole is offset. Further, in case the rotor 16 is shifted to the direction of the length of the center pin 18a, it is attracted to a certain position by the attracting force between the moving magnets 14, 15 and the first and the second stators 11, 12. Based on the description above, the rotary sensor of this type is impervious to being swung by vibration, and as a result, has an advantage of not producing output fluctuations.

A hole 16b is formed at the opposite side of the rotor 16 to which a rotating shaft 19 as a counterpart is fitted. As shown in FIG. 8, a cut portion 19a, which is called a D-cut from its sectional shape, is formed at the top end of the rotating shaft 19. In addition, the hole 16b has the same shape as the D-cut portion 19a of the rotating shaft. Therefore, when the D-cut portion 19a is fitted to the hole 16b, the rotation of one can be transferred to the other.

When the abovementioned rotating shaft 19 and the hole 16b of the rotor are fitted together, it is ideal that the axes of both of them are perfectly aligned. However, it is actually normal that there is some misalignment because of the variation of accuracy at the time of production.

Therefore, the rotor 16 is inclined due to the misalignment, and the distance T' between moving magnets 14, 15 and the first and the second stators 11, 12 which is shown in FIG. 7 fluctuates, and the detecting accuracy of the non-contact type rotary sensor 10 is greatly affected.

The present invention was devised in the light of the above-mentioned facts, and it is an object to provide a rotary sensor which can detect accurate angles even if there is some misalignment between the center of the rotor and the center of the rotating shaft.

DISCLOSURE OF THE INVENTION

To achieve the abovementioned object, the present invention adopts a coupling structure to connect a non-contact type rotary sensor and a rotating shaft which comprises a first stator having two magnet-facing sides which are disposed on a single arc and are apart from each other, a second stator having one magnet-facing side which is disposed between the two magnet-facing sides on the arc, a hall element disposed between the first and the second stators, a moving magnet having different polarities which is disposed along the outside arc of the three magnet-facing sides, and a rotor having the moving magnet, wherein a fitting hole is formed at the rotor in which the rotating shaft is loosely, the rotating shaft is inserted in the fitting hole and is pierced by a pin so as to have contact with the rotor and is supported so as to be free to swing, and a clearance-maintaining member is disposed to maintain a constant distance between the moving magnet and the first and the second stators. It is possible to adopt a structure of a steel ball as the clearance-maintaining member.

It is possible to adopt a structure wherein the width of the first stator and second stator is wider than the width of the moving magnet in the direction of the rotating shaft, the moving magnet always stays within the range of the width of the first stator and the second stator in the rotating range of the rotor, and the angle between the center line of the pin and the normal line of the rotating shaft at the initial position is within ±45°. It is also possible to adopt a structure that the center line of the pin overlaps the normal line.

BRIEF DISCRIPTION OF THE DRAWINGS

FIGS. 1(a) and 1(b) are views showing an embodiment of a coupling structure of a non-contact type rotary sensor and a rotating shaft of the present invention, with FIG. 1(a) being a sectional view of a main part of the coupling structure, and FIG. 1(b) being a left side view of the facing part of a rotor and a stator.

DETAILED DESCRIPTION OF THE INVENTION

An embodiment of the present invention is explained precisely with reference to the drawings.

Figure 2:
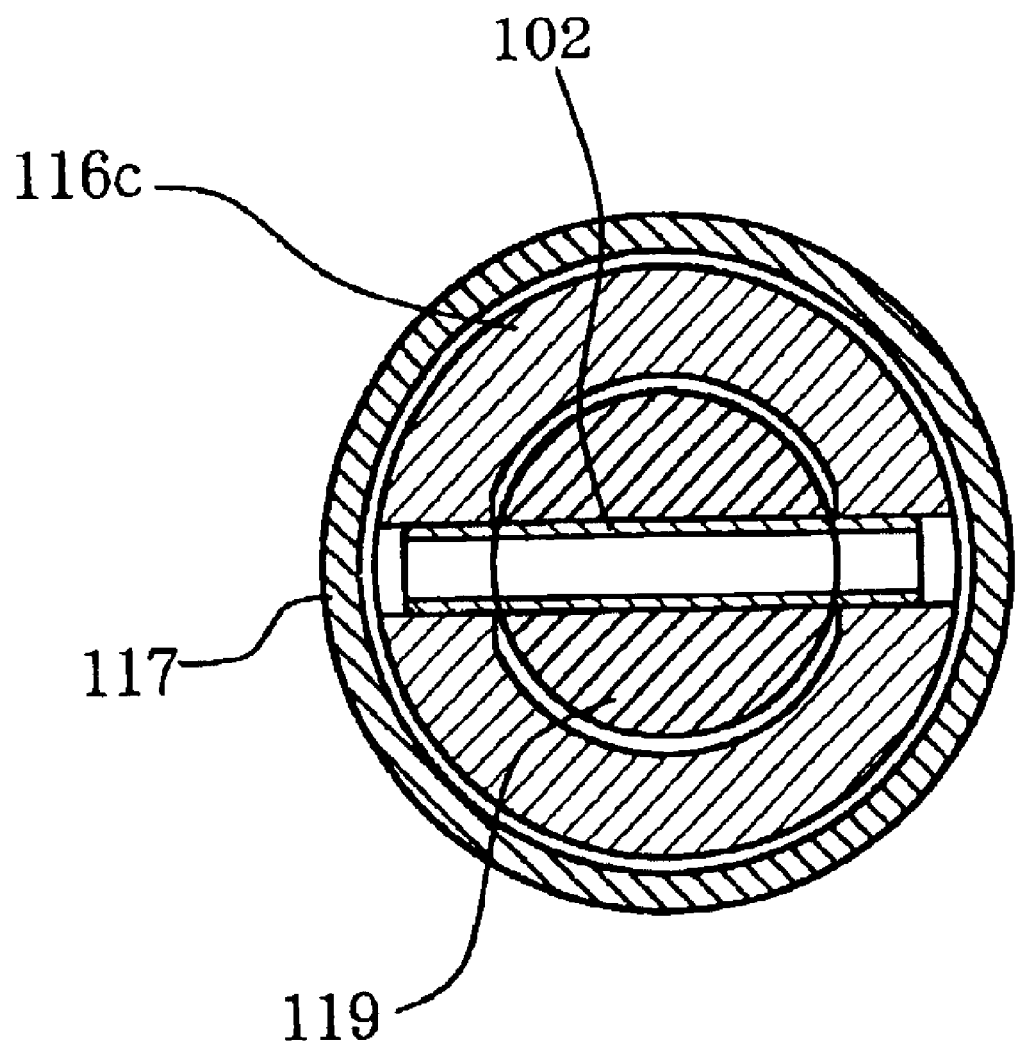
FIG. 2 is a sectional view along line II—II in FIG. 1(a).

FIG. 1(a) is a sectional view showing an embodiment of a coupling structure of a rotary sensor and a rotating shaft of the present invention, and FIG. 1(b) is a side view of a facing part of a rotor and a stator, as viewed from the left side of FIG. 1(a). FIG. 2 is a sectional view along line II—II in FIG. 1(a).

As shown in these figures, the first stator 111 and the second stator 112 are fitted at specific positions of a body 117 of the rotary sensor 110. Two magnet-facing sides 111a, 111b of the first stator 111 which are spaced apart from each other, and one magnet-facing side 112a of the second stator 112 which is disposed between them, are extended along the same arc. Although three magnet-facing sides 11a, 11b, 12a of the conventional example practically form a circle, those of this embodiment form about one-third of a circle. Two hall elements 113, 113 are disposed between the first stator 111 and the second stator 112, and a terminal 113a of the hall element 113 is connected to a terminal 101 of a connector, not shown in the figures, by soldering or the like.

A rotor 116 integrally connects a stator-facing portion 116a, which has a center of curvature the same as that of the arc formed by the three magnetic facing sides, and a supporting portion 116c which has a hole 116b that is fitted with the rotating shaft 119. There is no clearance at the diameter of the hole 116b in the direction in which a pin 102 is fitted, and the diameter of the hole 116b is larger than the diameter of the rotating shaft 119 in the direction which is perpendicular to the pin 102. The pin 102 is fitted to the rotating shaft 119 and the supporting portion 116c of the rotor 116, so as to prevent them from dislodging. A spring pin is used as the pin 102 to prevent looseness. As structured as abovementioned, the rotor 116 can rotate together with the rotating shaft 119, and can swing with the pin 102 being the center without misaligning in the direction of the pin 102.

In the same manner as the conventional example, moving magnets 114, 115 which are constituted by two plate-shaped magnets are disposed at the stator facing portion 116a. In the present embodiment, a steel 103 ball is provided as a clearance-maintaining member to maintain a constant clearance between the moving magnets 114, 115 and the first stator and the second stator 111, 112. The ball 103 is operably disposed radially between the stator-facing portion 116a of the rotor 116 and the first and second stators 111, 112.

Although the rotor 116 is attracted towards the first stator and the second stator 111, 112 by the attracting force of the moving magnets 114, 115, the ball 103 prevents them from sticking together, so that the clearance T can be kept constant. Furthermore, because the ball 103 is made of steel, it is attracted towards the moving magnets 114, 115 so that the position in the thrust direction of the rotating shaft 119 is constantly stable.

Next, the operation in case there is some misalignment between the center of the rotor 116 and the center of the rotating shaft 119 due to the variation of dimensional accuracy is explained. Because this rotary sensor 110 is the type to detect rotating angles by the changes of magnetic flux, when the distance T between the moving magnets 114, 115 and the first stator 111 or the second stator 112 varies, the magnetic flux to the hall element varies so that output fluctuations are produced.

However, with the structure of the embodiment of the present invention, even if there is some misalignment between the center of the rotating shaft and the rotor, the distance T between the moving magnets 114, 115 and the first and the second stator 111, 112 are determined by the ball 103, and the misalignment is absorbed by the swing of the rotor 116. On the other hand, the rotor 116 and the rotating shaft 119 are connected by the pin 102, and the connection produces no looseness at all in the rotating direction. Therefore, the rotating angle of the rotating shaft 119 can be detected accurately. Especially, when the ball 103 is made of steel, because it is attracted towards the moving magnets 114, 115 by magnetic force, the position in the rotating shaft 119 direction becomes stable. Then, the fluctuation of the distance T becomes smaller.

Furthermore, even if some misalignment of the rotating shaft 119 occurs due to dimensional accuracy or wear by operation or the like at the center of the bearing, the rotor 116 is not strained. Therefore, high durability of the rotor is obtained.

Figure 3:
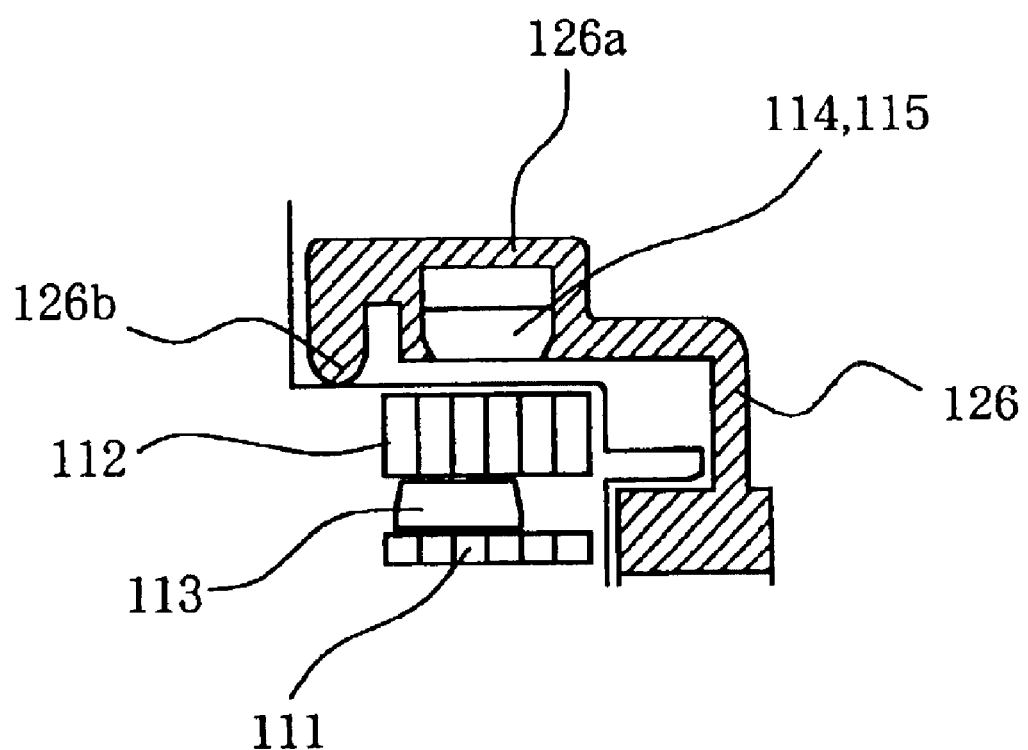
FIG. 3 is a sectional view of a main part of the coupling structure in an embodiment which does not adopt a ball as a clearance-maintaining member.

FIG. 3 shows an embodiment which does not adopt a ball, and is a view showing the vicinity of a stator facing portion 126a of a rotor 126. As shown, a projection 126b can be used instead of a ball 103 as a clearance-maintaining member. In this structure, the cost is reduced since the rotor can be integrally formed of resin or the like.

Figure 4:
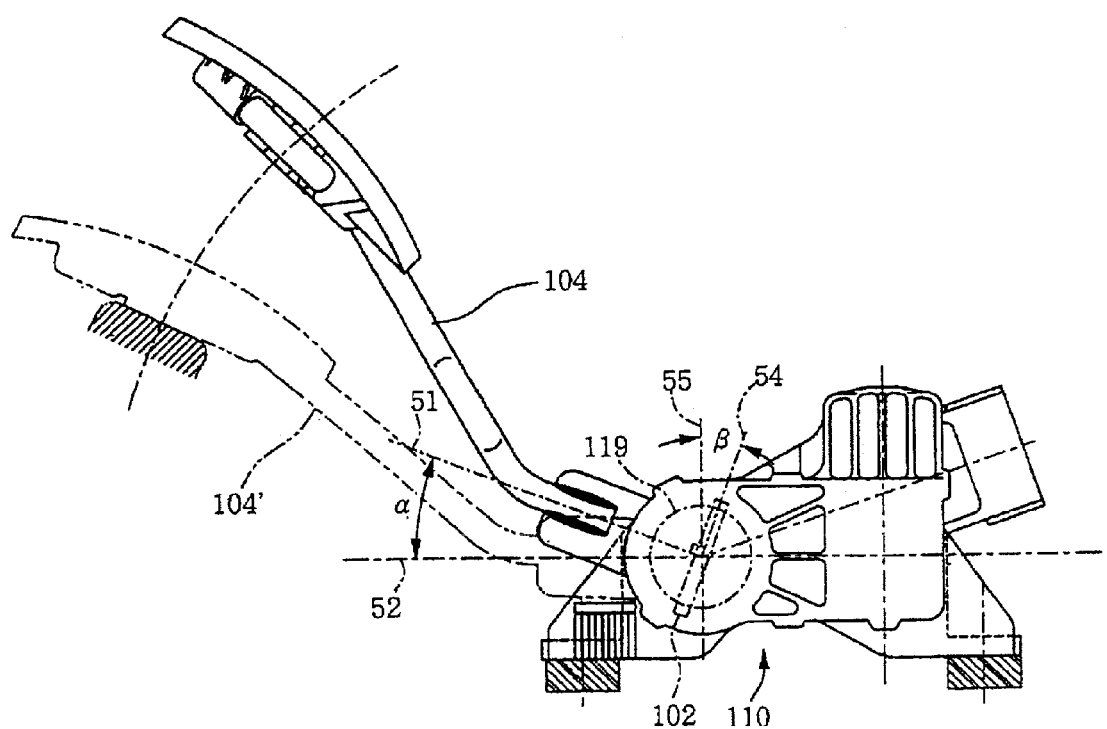
FIG. 4 is a side view showing a state in which a non-contact type rotary sensor is coupled with an acceleration pedal of the present invention is.

As shown in FIG. 4, an acceleration pedal 104 is connected to the rotating shaft 119 of the non-contact type rotary sensor 110 of the present invention. Namely, the rotary sensor 110 of this embodiment is used to detect the depressing amount of the acceleration pedal.

The rotating angle range of the acceleration pedal 104 is relatively small, approximately 10° through 20°. Then, because the rotating movement is repeated within the narrow rotating range, the contacting portions between the rotating shaft 119 and the hole 116b of the rotor receive intensive contacting force and are worn in a lopsided manner.

Figure 5:
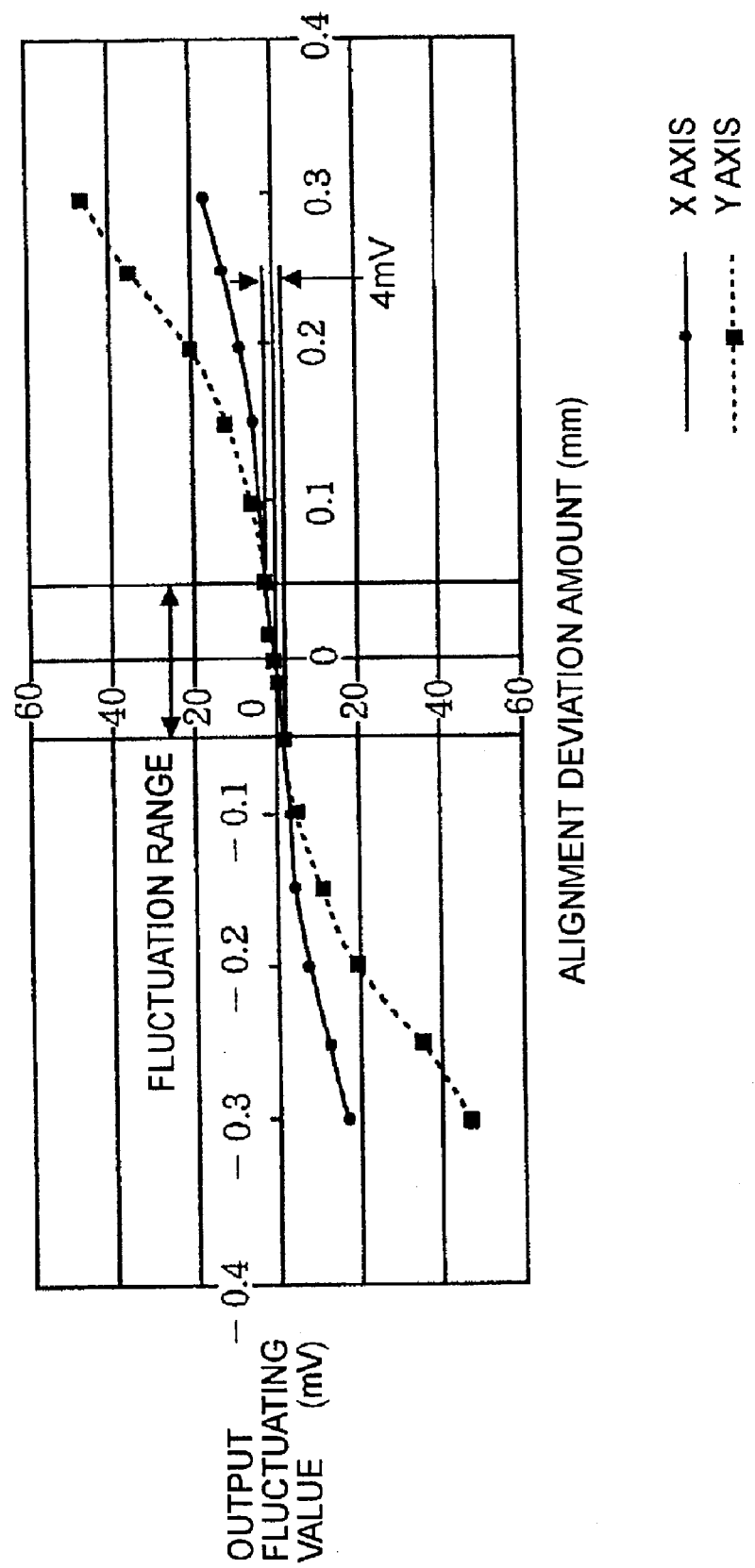
FIG. 5 is a diagram showing the relationship between offset amounts of a rotating shaft and output fluctuation values of the sensor.
Figure 6:
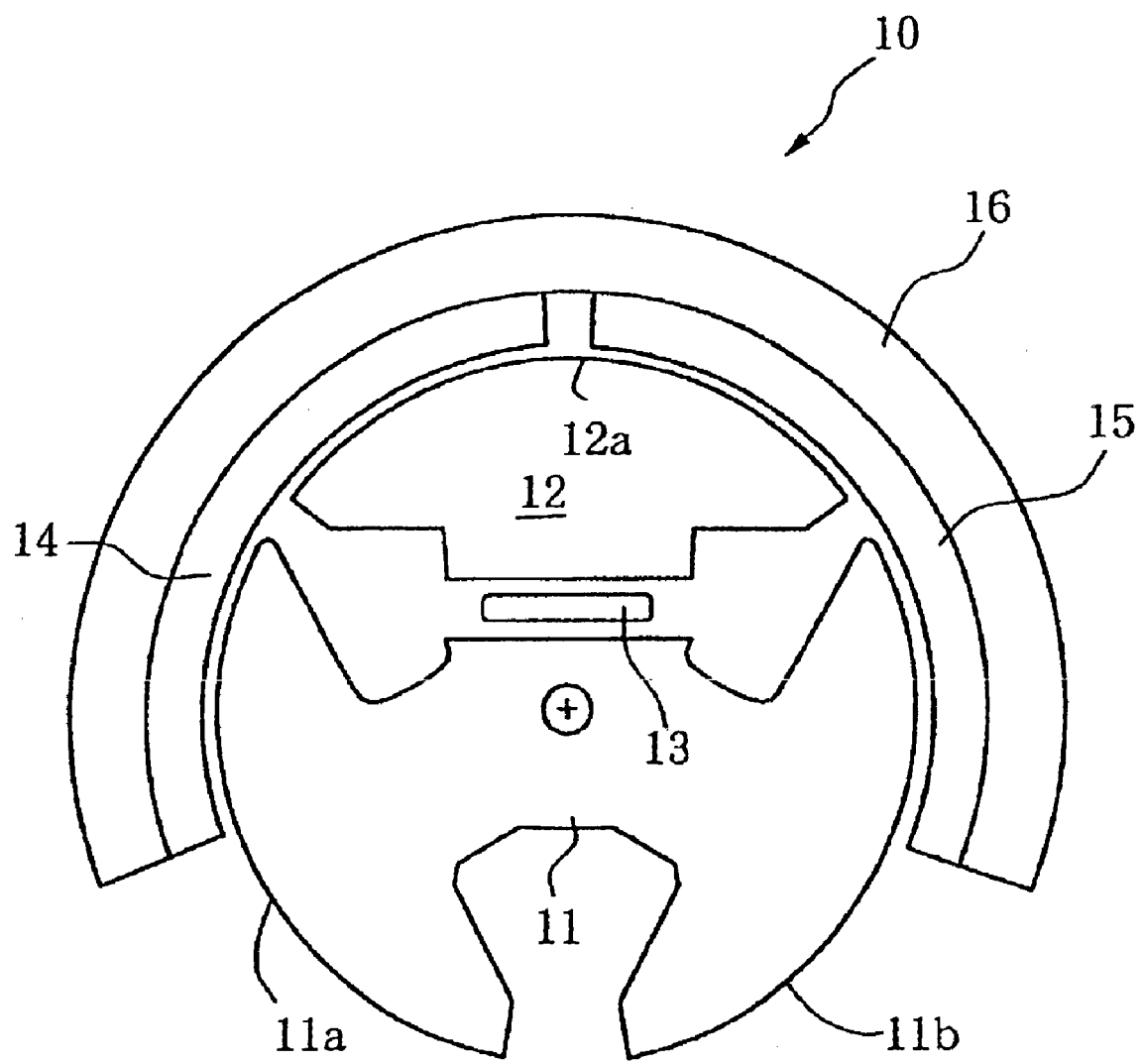
FIG. 6 is a view showing a structure of a conventional non-contact type rotary sensor.
Figure 7:
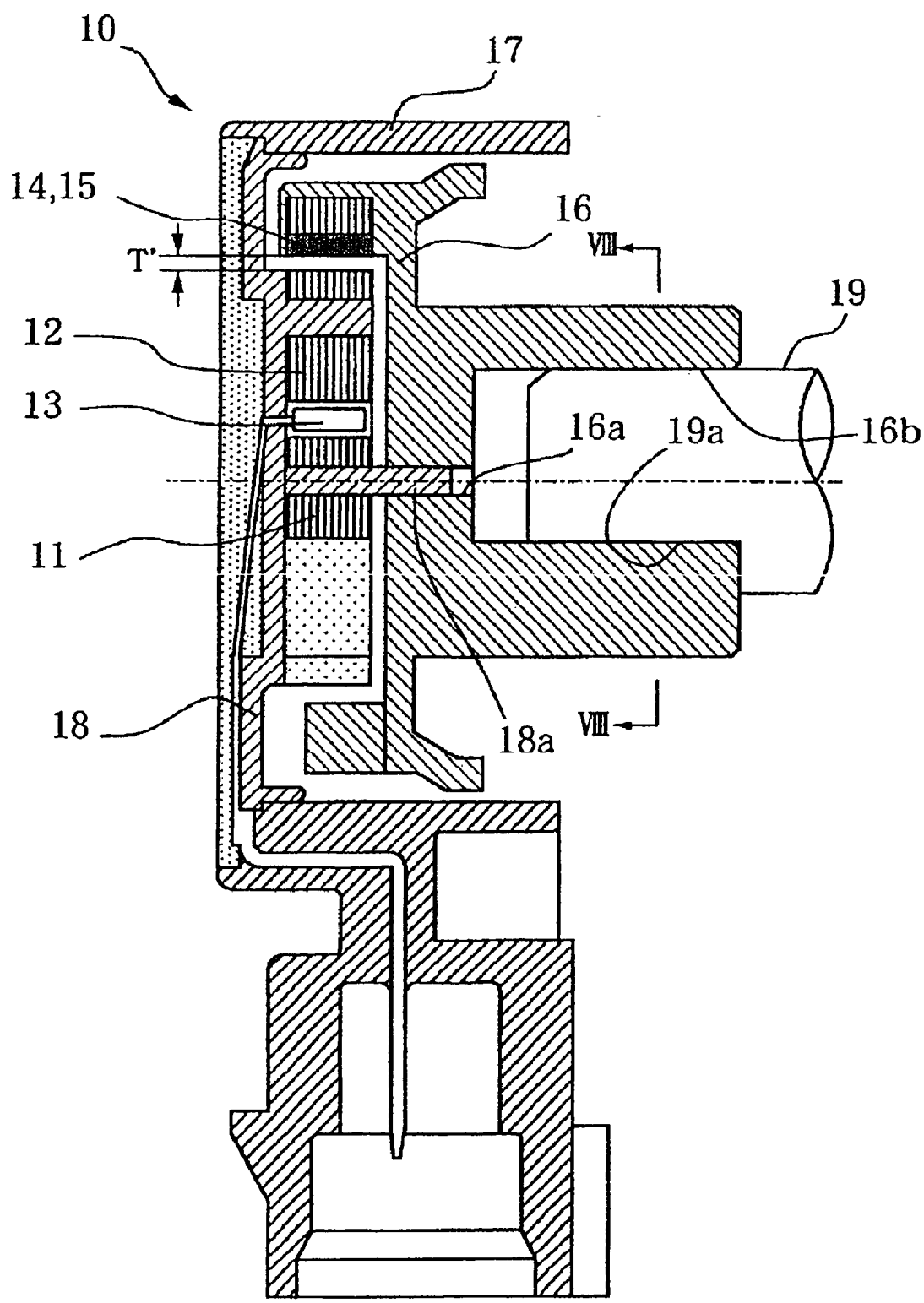
FIG. 7 is a sectional view showing an assembling state of a rotary sensor of FIG. 6.
Figure 8:
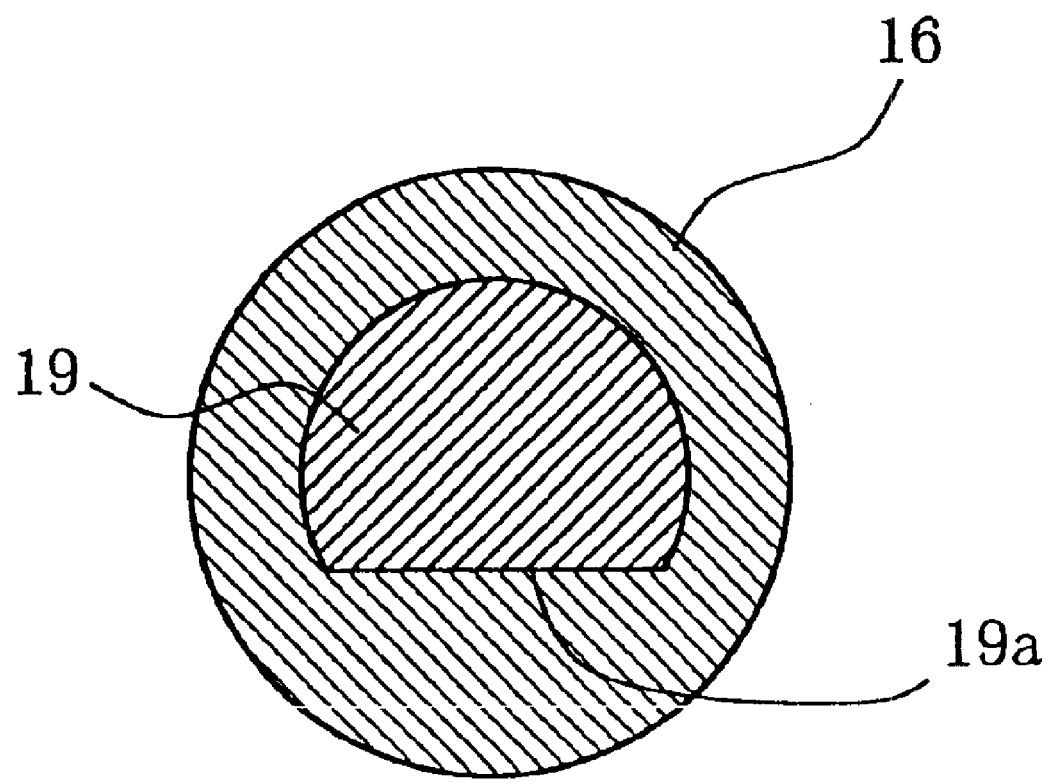
FIG. 8 is a sectional view along line VIII—VIII in FIG. 7.

Here, each of the axes x, y, z is defined as shown in FIG. 1(b). The direction of the length of the pin 102 is along the x axis, and the direction of the diameter of the rotating shaft 119, which is perpendicular to the x axis, is along the y axis. Then, when the relationship between offset amounts due to the wear and output fluctuation values is examined, the diagram shown in FIG. 5 is obtained. In this figure, a solid line shows the output changes to the offset amounts along the x axis, and a dotted line shows those to the offset amounts along the y axis, respectively. It is found that the wear in the y axis direction is more sensitive to the output of the rotary sensor than that in the x-axis direction. On the contrary, even if the wear occurs in the z axis direction, the misalignment in the z axis direction does not cause any output change, as long as the width b of the first and second stators 111, 112 in FIG. 1(a) is wider than the width B of the moving magnets 114, 115, and the width B of the moving magnets 114, 115 is within the range of the width b of the first and second stators 111, 112 during an operating state.

Therefore, in the embodiment of the present invention, the pin 102 is disposed along the direction in which the wear due to the operation occurs.

It is explained more specifically with reference to FIG. 4. In FIG. 4, a line 51 shows the position where the acceleration pedal 104 is at an idling state, namely, the initial position of the rotating shaft. A line 52 shows the position where the acceleration pedal is at a full throttle state, shown as 104'. A line 54 is a normal line to the line 51. When the acceleration pedal 104 is pressed and depressed repeatedly between the line 51 and the line 52, which is the rotating range, the wear occurs at the bearing hole of the rotating shaft in the direction of the normal line 54. Therefore, the pin 102 is arranged so that the normal line 54 is aligned with the center line of the pin 102 (X axis). Even in case when it is impossible to set it to be perpendicular, setting the angle β, which is the angle between the center line 55 of the pin 102 and the normal line 54, within ±45° is still effective, and setting it within ±30° is the desired range because of high effectiveness.

To utilize the structure of this embodiment, firstly, the rotating shaft 119 is attached to the rotor 116 by the pin 102 so that the rotor 116 is free to swing. Next, the rotating shaft 119 is assembled with the acceleration pedal 104 so that the pin 102 is perpendicular to the line 51 of the initial position of the acceleration pedal 104, or within ±45° (more desirably ±30).

In addition, although two magnets are used in the present invention, the invention is not limited to this, and it is also possible to use one magnet which has different polarities.

INDUSTRIAL APPLICABILITY

According to the present invention, in a coupling structure to connect a non-contact type rotary sensor and a rotating shaft, a fitting hole is formed at the rotor in which the rotating shaft is loosely fitted, the rotating shaft is supported by a pin which pierces the rotating shaft, and a clearance-maintaining member is disposed to maintain the distance between the moving magnet and the first and second stators constant. Therefore, even in case misalignment between the rotating shaft and the center of the rotor occurs, or in case some looseness is produced due to the wear at the bearing of the rotating shaft, the looseness is absorbed by the swinging movement of the rotor about the pin as the center of swinging rotation, and the distances between the moving magnet and the first and second stators are kept constant by the clearance-maintaining member, so that accurate detection of the angle is possible.

When a steel ball is used as the clearance-maintaining member, the wear during the rotation of the rotor is decreased so that the durability is improved. Furthermore, because steel is a magnetic material, it is attracted towards the moving magnet and the position of the steel ball becomes stable. Then, the detecting accuracy can be further improved.

When a structure is adopted wherein the widths width of the first stator and second stator are wider than the width of the moving magnet in the direction of the rotating shaft, such that the moving magnet always stays within the range of the width of the first stator and the second stator in the rotating range of the rotor, and wherein the angle between the center line of the pin and the normal line of the initial position of the rotating shaft is within ±45°, even if lopsided wear is produced at the rotating shaft due to the small range of the rotation, the degradation of accuracy of the angle detection can be minimized.

What is claimed is:

1. A coupling structure for a non-contact type rotary sensor, comprising:

a first stator having two magnet-facing sides which are disposed on a single arc and are spaced apart from each other;

a second stator having one magnet-facing side which is disposed on said arc between said two magnet-facing sides of said first stator;

a hall element disposed between said first stator and said second stator;

a moving magnet disposed outside said arc; and a rotor having said moving magnet;

wherein said rotor is provided with a fitting hole;

wherein a rotating shaft is loosely fitted in said fitting hole of said rotor and is pierced by a pin, so that said rotating shaft contacts with said rotor and such that said rotating shaft is supported in said fitting hole by said pin so that said rotating shaft is swingable about said pin relative to said rotor; and wherein a clearance-maintaining member is disposed to maintain a constant distance between said moving magnet and said first and second stators.

2. The coupling structure according to claim 1, wherein said clearance-maintaining member comprises a steel ball.

3. The coupling structure according to claim 1, wherein said clearance-maintaining member is arranged to move along an arc about said rotation shaft upon rotation of said rotor so as to accommodate rotational displacement of said rotor relative to said first and second stators.

4. The coupling structure according to claim 1, wherein said pin secures said rotor to said rotating shaft such that said rotor rotates together with said rotating shaft.

5. The coupling structure according to claim 1, wherein said clearance-maintaining member constitutes a radial bearing for bearing a load of said rotor in a radial direction of said rotor.

6. The coupling structure according to claim 5, wherein said clearance-maintaining member is operably disposed radially between said rotor and said first and second stators.

7. The coupling structure according to claim 1, wherein said clearance-maintaining member is operably disposed radially between said rotor and said first and second stators.

8. The coupling structure according to claim 1, wherein said moving magnet comprises two magnetic poles having opposite polarities.

* * * * *